United States Patent
Ura (10) Patent No.: US 8,942,890 B2
(45) Date of Patent: Jan. 27, 2015

(54) TORQUE DETECTING DEVICE AND ELECTRIC POWER STEERING SYSTEM

(75) Inventor: Noritake Ura, Anjo (JP)

(73) Assignee: JTEKT Corporation, Osaka-Shi (JP)

( * ) Notice: Subject to any disclaimer, the term of this patent is extended or adjusted under 35 U.S.C. 154(b) by 22 days.

(21) Appl. No.: 13/979,211

(22) PCT Filed: Jan. 30, 2012

(86) PCT No.: PCT/JP2012/051987
§ 371 (c)(1),
(2), (4) Date: Jul. 11, 2013

(87) PCT Pub. No.: WO2012/111415
PCT Pub. Date: Aug. 23, 2012

(65) Prior Publication Data
US 2013/0282239 A1    Oct. 24, 2013

(30) Foreign Application Priority Data

Feb. 15, 2011 (JP) .................. 2011-029648
Mar. 25, 2011 (JP) .................. 2011-066927

(51) Int. Cl.
*B62D 5/00* (2006.01)
*B62D 5/04* (2006.01)
*B62D 6/10* (2006.01)
*G01L 3/10* (2006.01)

(52) U.S. Cl.
CPC ............... *B62D 5/0463* (2013.01); *B62D 6/10* (2013.01); *G01L 3/105* (2013.01)
USPC ......................................................... 701/41

(58) Field of Classification Search
None
See application file for complete search history.

(56) References Cited

U.S. PATENT DOCUMENTS

2004/0041677 A1    3/2004    Matsuura et al.
2005/0065686 A1    3/2005    Kohno et al.

FOREIGN PATENT DOCUMENTS

| JP | A-2003-279427 | 10/2003 |
| JP | A-2005-91204  | 4/2005  |
| JP | A-2005-147733 | 6/2005  |
| JP | A-2007-51683  | 3/2007  |
| JP | A-2008-51702  | 3/2008  |
| JP | A-2009-69106  | 4/2009  |
| JP | A-2009-98028  | 5/2009  |
| JP | A-2012-32198  | 2/2012  |
| JP | A-2012-42353  | 3/2012  |

OTHER PUBLICATIONS

Apr. 10, 2012 International Search Report issued in International Patent Application No. PCT/JP2012/051987.

*Primary Examiner* — Thomas Tarcza
*Assistant Examiner* — Garrett Evans
(74) *Attorney, Agent, or Firm* — Oliff PLC (57) ABSTRACT

A torque detecting device and an electric power steering system are provided. A torque sensor includes a first rotor that is fixed to an input shaft and that has a predetermined shaft angle multiplier, and a second rotor that is fixed to an output shaft and that has a shaft angle multiplier different from that of the first rotor. In first to fourth output coils arranged on a stator that is arranged around outer peripheries of the first and second rotors, electric signals having different phases are generated on the basis of a variation of a gap between the stator and the first and second rotors. A twist angle of a torsion bar is calculated on the basis of the electric signals, and a torque that acts between the input shaft and the output shaft is calculated on the basis of the twist angle.

5 Claims, 6 Drawing Sheets

TORQUE DETECTING DEVICE AND ELECTRIC POWER STEERING SYSTEM

TECHNICAL FIELD

The invention relates to a torque detecting device and an electric power steering system.

BACKGROUND ART

Conventionally, there is known a torque detecting device described in, for example, Patent Document 1. In the torque detecting device, an input shaft and an output shaft are coaxially coupled to each other via a torsion bar. The torque detecting device includes a first rotation angle detecting device that detects a rotation angle of the input shaft and a second rotation angle detecting device that detects a rotation angle of the output shaft. The torque detecting device detects a torque that is applied to the input shaft on the basis of a difference between the rotation angle of the input shaft, which is detected by the first rotation angle detecting device, and the rotation angle of the output shaft, which is detected by the second rotation angle detecting device, that is, on the basis of a twist angle of the torsion bar. The torque detecting device is used, for example, in an electric power steering system.

PRIOR ART DOCUMENT

Patent Document

Patent Document 1: Japanese Patent Application Publication No. 2009-69106

SUMMARY OF THE INVENTION

Problem to be Solved by the Invention

The first rotation angle detecting device includes an annular magnet that integrally rotates with the input shaft and three magnetic sensors that respectively generate electric signals based on a magnetic field that varies with rotation of the magnet. These magnetic sensors are provided so as to face the magnet in an axial direction of the magnet. The first rotation angle detecting device computes the rotation angle of the magnet, and accordingly, the rotation angle of the input shaft, on the basis of the three electric signals. The second rotation angle detecting device also has a similar configuration.

Here, when the first and second rotation angle detecting devices are provided in proximity to each other, it may not be possible to obtain an accurate rotation angle due to the influence of magnetic fields that are respectively generated from the two magnets of these devices on each other's magnetic sensors. Therefore, in Patent Document 1, the first and second rotation angle detecting devices are spaced apart from each other to such an extent that the magnetic field that is generated from the magnet of the second rotation angle detecting device does not influence the magnetic sensors of the first rotation angle detecting device, that is, to such an extent that the magnetic field that is generated from the magnet of the first rotation angle detecting device does not influence the magnetic sensors of the second rotation angle detecting device.

With this configuration, in fact, it is possible to maintain the detection accuracy of each magnetic sensor. However, it is required to ensure a certain distance between the first and second rotation angle detecting devices, and this is one of factors that impair a reduction in the size of the body of the torque detecting device. Particularly, in a torque detecting device that is applied to an electric power steering system for an automobile, a request for a reduction in the size of the body is still strict, but since it is required to ensure a certain distance between the first and second rotation angle detecting devices as described above, there is a limit to a reduction in the size of the torque detecting device.

One of objects of the invention is to provide a torque detecting device and an electric power steering system, of which the size of the body is reduced.

Means for Solving the Problem

According to one of features of the invention, there is provided a torque detecting device that detects a torque that acts between first and second shafts respectively coupled to both ends of a torsion bar, the torque detecting device including: a first resolver rotor that is fixed to the first shaft and that has a predetermined shaft angle multiplier; a second resolver rotor that is fixed to the second shaft and that has a shaft angle multiplier different from that of the first resolver rotor; a resolver stator that is arranged in proximity to outer peripheries of the first and second resolver rotors; four output coils that are arranged on the resolver stator and that respectively generate electric signals having different phases on the basis of a variation of a gap between the resolver stator and the first and second resolver rotors due to rotation of the first and second resolver rotors; and computing means for calculating a difference between rotation angles of the first and second shafts as a twist angle of the torsion bar on the basis of the electric signals that are respectively generated in the four output coils, and calculating the torque on the basis of the twist angle.

Effect of the Invention

According to the invention, the resolver stator (hereinafter, referred to as stator) is arranged in proximity to the outer peripheries of the first and second resolver rotors (hereinafter, referred to as rotors), and the rotation angles of the first and second rotors, and accordingly, the rotation angles of the first and second shaft are determined, by using in common the electric signals that are respectively generated in the four output coils arranged on the stator, and it is possible to set a distance between the first and second rotors to a smaller value. Thus, the size of the body of the torque detecting device is reduced by the reduced distance. In addition, in the case where the twist angle of the torsion bar is calculated on the basis of the electric signals that are respectively generated in the four output coils, the smaller distance between the first and second rotors is better, and this leads to a reduction in the size of the body of the torque detecting device.

MODES FOR CARRYING OUT THE INVENTION

Hereinafter, an embodiment in which the invention is implemented as an electric power steering system will be described with reference to FIG. 1 to FIG. 6.

<Outline of Electric Power Steering System>

Figure 1:
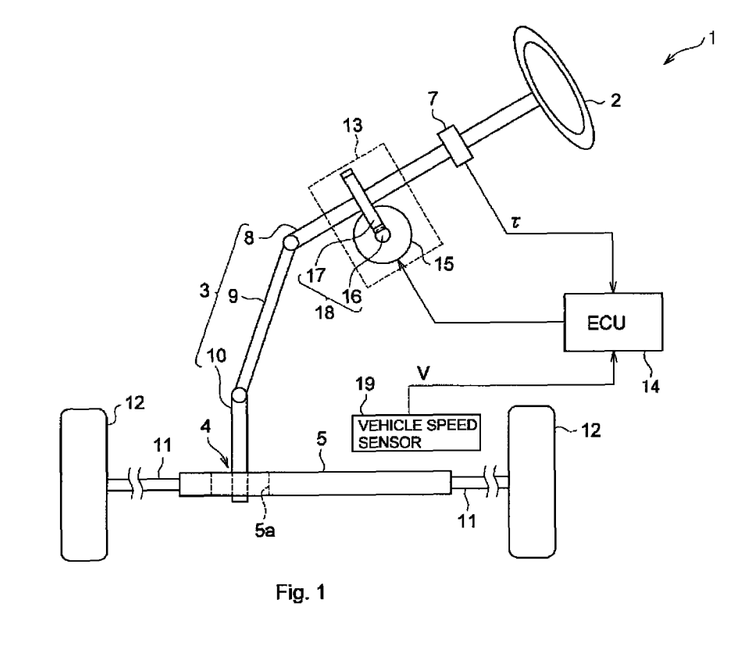
FIG. 1 is a configuration view that shows the schematic configuration of an electric power steering system.

As shown in FIG. 1, in an electric power steering system 1, a steering shaft 3 that rotates integrally with a steering wheel 2 is formed by sequentially connecting a column shaft 8, an intermediate shaft 9 and a pinion shaft 10 from the steering wheel 2 side. The pinion shaft 10 is in mesh with a rack portion 5a of a rack shaft 5 that is provided to be orthogonal to the pinion shaft 10. The rotation of the steering shaft 3 due to steering operation is converted to the reciprocating linear motion of the rack shaft 5 by a rack-and-pinion mechanism 4 that is formed of the pinion shaft 10 and the rack portion 5a. The reciprocating linear motion is transmitted to knuckle arms (not shown) via tie rods 11 respectively coupled to both ends of the rack shaft 5. Thus, the steered angle of steered wheels 12 is changed.

In addition, the electric power steering system 1 includes a steering force assist device 13 and an electronic control unit (ECU) 14. The steering force assist device 13 applies assist force for assisting steering operation to a steering system. The ECU 14 controls operation of the steering force assist device 13. A motor 15 that is a driving source of the steering force assist device 13 is operatively coupled to the column shaft 8 via a speed reduction mechanism 18 formed of a worm 16 and a worm wheel 17. The rotation force of the motor 15 is reduced in speed by the speed reduction mechanism 18, and the rotation force reduced in speed is transmitted to the steering system, accurately, the column shaft 8, as assist force. The ECU 14 controls the assist force as follows. That is, the ECU 14 acquires a vehicle speed V through a vehicle speed sensor 19 provided at the steered wheels 2, or the like, and a steering torque τ, which is applied to the steering wheel 2, through a torque sensor (torque detecting device) 7 provided at the column shaft 8. The ECU 14 calculates a target assist force corresponding to a driver's request and a travel state on the basis of the vehicle speed V and the steering torque τ, and executes power supply control over the motor 15 in order to generate the calculated target assist force. Assist force that is applied to the steering system is controlled though the power supply control over the motor 15.

<Torque Sensor>

Figure 2:
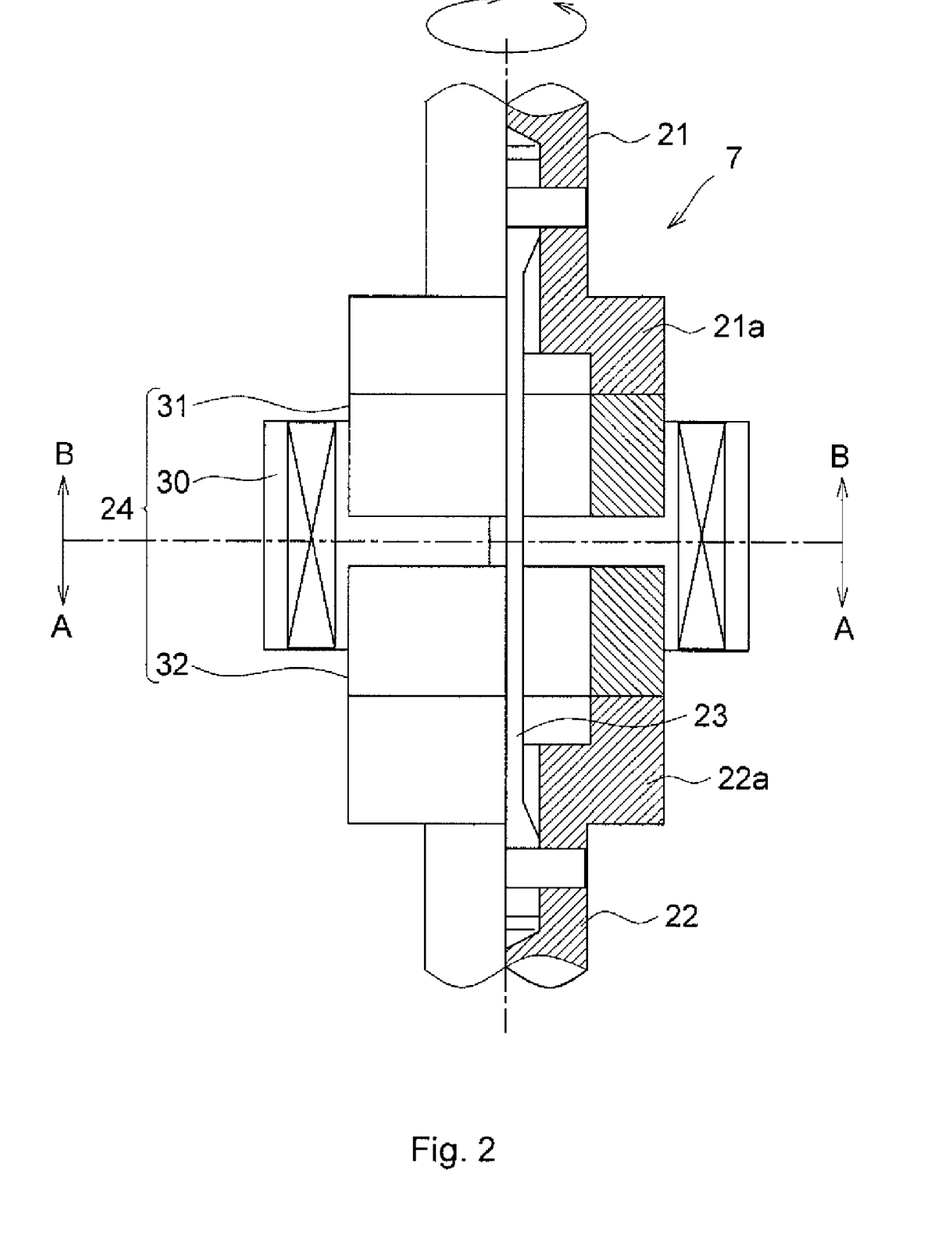
FIG. 2 is a half sectional view of a torque sensor (torque detecting device).

Next, the configuration of the torque sensor will be described in detail. As shown in FIG. 1, the torque sensor 7 is provided at the column shaft 8 at a position between the steering wheel 2 and the steering force assist device 13. As shown in FIG. 2, the torque sensor 7 includes an input shaft 21, an output shaft 22 and a torsion bar 23 that couples these shafts. The input shaft 21 is coupled to a steering wheel 2-side portion of the column shaft 8, and the output shaft 22 is coupled to a steering force assist device 13-side portion of the column shaft 8. Cylindrical first and second support portions 21a, 22a are respectively formed at two mutually facing end portions of the input shaft 21 and the output shaft 22. The outside diameters of these first and second support portions 21a, 22a are set so as to be larger than the outside diameters of the input shaft 21 and the output shaft 22, respectively.

A rotation angle sensor 24 is provided between the input shaft 21 and the output shaft 22. The rotation angle sensor 24 includes a first rotor 31, a second rotor 32 and a stator 30. Each of the first and second rotors 31, 32 is formed to have a cylindrical shape having openings at both ends by, for example, stacking silicon steel plates. The first rotor 31 is fixed to a side face of the first support portion 21a, which is on a side opposite to the input shaft 21, in a state where the torsion bar 23 is inserted in the first rotor 31. The second rotor 32 is fixed to a side face of the second support portion 22a, which is on a side opposite to the output shaft 22, in a state where the torsion bar 23 is inserted in the second rotor 32. The stator 30 that is formed by stacking, for example, silicon steel plates is arranged in proximity to the outer peripheries of the first and second rotors 31, 32.

Figure 3A:
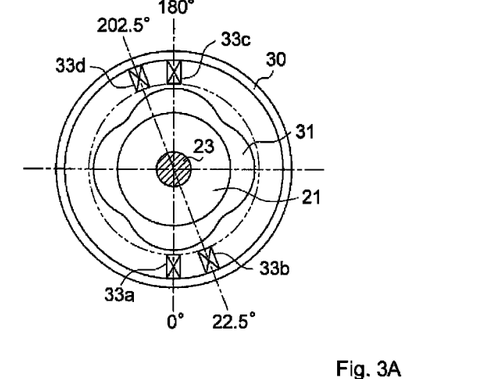
FIG. 3A is a sectional view taken along the line A-A in FIG. 2.
Figure 3B:
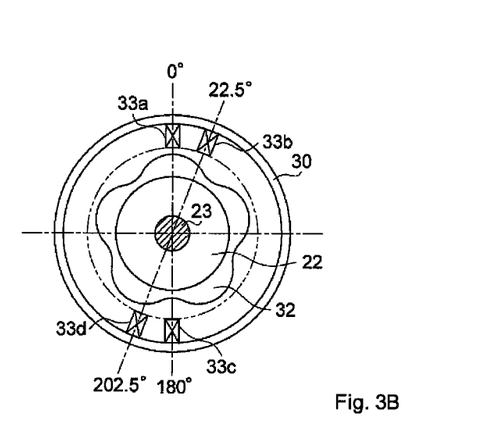
FIG. 3B is a sectional view taken along the line B-B in FIG. 2.

As shown in FIG. 3, a known exciting coil (not shown) and first to fourth output coils 33a to 33d are respectively wound at predetermined positions around a plurality of teeth so as to form a transformer. The teeth are formed in the stator 30 at equal intervals in a circumferential direction. Each of the first and second rotors 31, 32 is a rotor having an outer peripheral shape in which a plurality of protruding portions is formed in the circumferential direction of the corresponding one of the first and second rotors 31, 32. The first rotor 31 shown in FIG. 3A has the four protruding portions in total, and similarly, the second rotor 32 shown in FIG. 3B has the five protruding portions in total.

As shown in FIG. 3A and FIG. 3B, the first and third output coils 33a, 33c are provided so as to be shifted by 180° from each other, and the second and fourth output coils 33b, 33d are provided so as to be shifted by 180° from each other such that four signals (output voltages) that are shifted in phase from one another are respectively output from the first to fourth output coils 33a to 33d. More specifically, as shown in FIG. 3B, when the second rotor 32 is viewed from the input shaft 21 side, the first output coil 33a is provided so as to correspond to the twelve o'clock position of the second rotor 32. The second output coil 33b is provided so as to correspond to the position of 22.5° when the twelve o'clock position of the second rotor 32 is set to 0°. Similarly, the third output coil 33c is provided so as to correspond to the position of 180°, and the fourth output coil 33d is provided so as to correspond to the position of 202.5°.

<Electrical Configuration>

Figure 4:
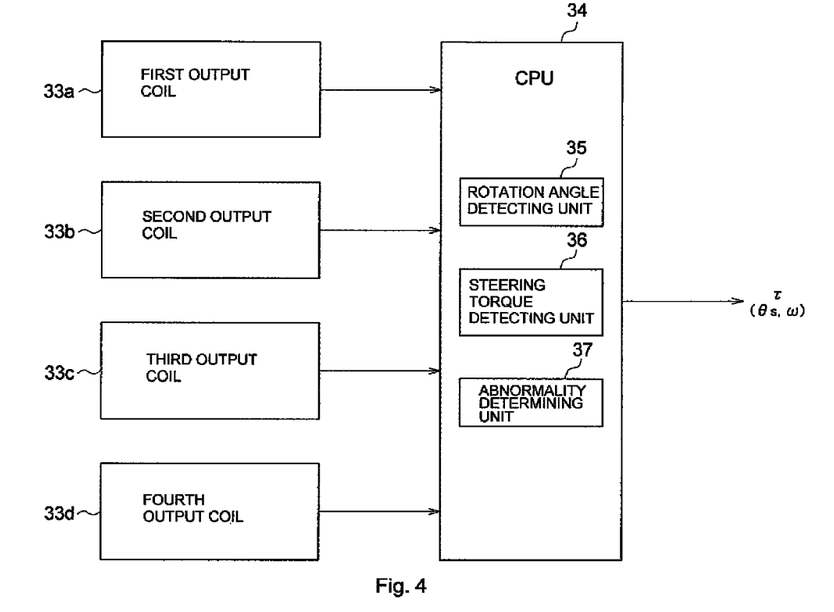
FIG. 4 is a block diagram that shows the electrical configuration of the torque sensor.

Next, the electrical configuration of the torque sensor will be described. As shown in FIG. 4, the first to fourth output coils 33a to 33d are connected to a microcomputer (CPU) 34. In the present embodiment, a resolver is employed as the first to fourth output coils 33a to 33d. In the resolver, a gap between the stator and the rotor is varied on the basis of the rotation angle of the rotor, and a variation of magnetic resistance is detected. A sinusoidal exciting voltage is supplied to the exciting coil (not shown), and each of the first to fourth output coils 33a to 33d generates a sinusoidal electric signal (output voltage) based on a variation of the magnetic resistance.

Figure 5A:
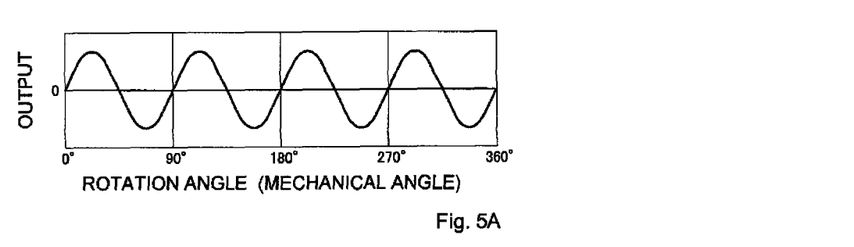
FIG. 5A is an output waveform chart of one of output coils with respect to a variation of a gap between a first rotor and a stator.

For example, the case where only a variation of a gap between the first rotor 31 and the stator 30 occurs is assumed. In this case, the first output coil 33a generates an electric signal based on a variation of magnetic resistance as the first rotor 31 rotates. In this case, the relation between a rotation angle (mechanical angle) of the input shaft 21 and an output of the first output coil 33a is shown by the graph of FIG. 5A. The abscissa axis of FIG. 5A represents the rotation angle of the input shaft 21, and similarly the ordinate axis represents the output (voltage value) of the first output coil 33a. As shown in FIG. 5A, as the input shaft 21 rotates, an electric signal that is generated in the first output coil 33a varies sinusoidally. In the present embodiment, while the input shaft 21 rotates one revolution, an electric signal for four cycles is generated in the first output coil 33a. That is, the shaft angle multiplier that is the ratio of the electric angle of the electric signal to the rotation angle (mechanical angle) of the input shaft 21 is set to a shaft angle multiplier of 4 (4×). The shaft angle multiplier is determined on the basis of the number of the protruding portions of the first rotor 31.

Figure 5B:
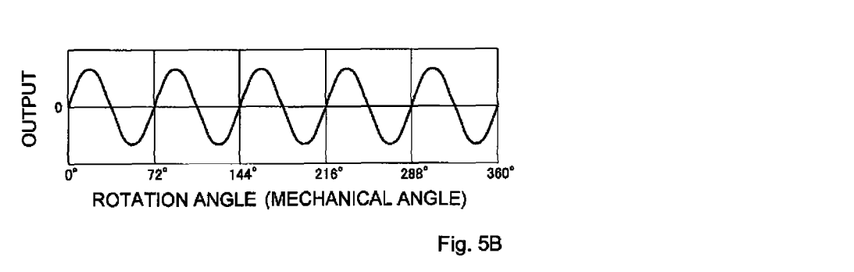
FIG. 5B is an output waveform chart of one of the output coils with respect to a variation of a gap between a second rotor and the stator.

The case where only a variation of a gap between the second rotor 32 and the stator 30 occurs is assumed. The first output coil 33a generates an electric signal based on a variation of magnetic resistance as the second rotor 32 rotates. In this case, the relation between a rotation angle (mechanical angle) of the output shaft 22 and an output of the first output coil 33a is shown by the graph of FIG. 5B. As shown in FIG. 5B, as the output shaft 22 rotates, an electric signal that is generated in the first output coil 33a varies sinusoidally. In the present embodiment, while the output shaft 22 rotates one revolution, an electric signal for five cycles is generated in the first output sensor 33a. That is, the shaft angle multiplier is set to a shaft angle multiplier of 5 (5×). The shaft angle multiplier is determined on the basis of the number of the protruding portions of the second rotor 32.

The same applies to the second to fourth output coils 33b to 33d. In each of these second to fourth output coils 33b to 33d, a sinusoidal electric signal shifted in phase on the basis of a relative positional relationship with respect to the first output coil 33a is generated. When the phase of the first output coil 33a is set to 0°, the output waveforms of the second to fourth output coils 33b to 33d are waveforms that are respectively shifted in phase by 22.5°, 180°, 202.5° with respect to the output waveform of the first output coil 33a, which is shown in FIG. 5A and FIG. 5B.

As described above, the first to fourth output coils 33a to 33d are provided on the stator 30 arranged in proximity to the outer peripheries of the first and second rotors 31, 32. The rotation angles of the input shaft 21 and the output shaft 22 differ from each other. Therefore, actually, outputs of the first to fourth output coils 33a to 33d are respectively combined outputs generated due to mutual magnetic interference between the first and second rotors 31, 32, and electric signals based on the combined outputs are generated.

Figure 5C:
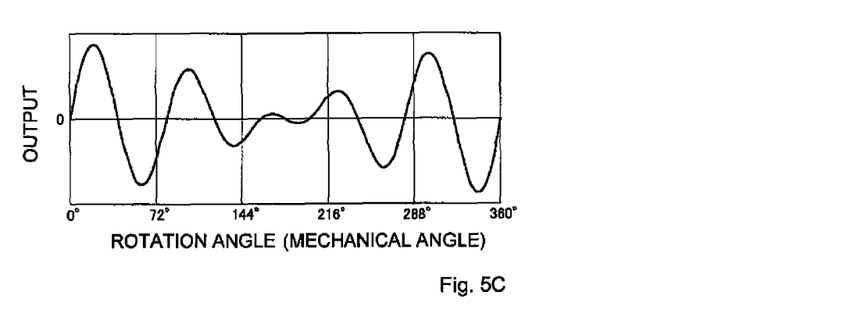
FIG. 5C is an output waveform chart of one of the output coils with respect to a variation of a gap between the first and second rotors and the stator.

That is, the electric signal that is generated in each of the first to fourth output coils 33a to 33d is obtained by combining an electric signal that is generated on the basis of the rotation angle of the first rotor 31 (hereinafter, referred to as 4× component (first signal component)) with an electric signal that is generated on the basis of the rotation angle of the second rotor 32 (hereinafter, referred to as 5× component (second signal component)). Taking the first output coil 33a as an example, the relation between a rotation angle (mechanical angle) of the input shaft 21 or the output shaft 22 and an output of the first output coil 33a is actually as shown in the graph of FIG. 5C. As shown in FIG. 5C, as the input shaft 21 or the output shaft 22 rotates, an electric signal that is generated in the first output coil 33a partially sinusoidally varies, but it varies so as to draw an irregular curve as a whole. The same applies to the second to fourth output coils 33b to 33d.

The CPU 34 includes a rotation angle detecting unit 35, a steering torque detecting unit 36 and an abnormality determining unit 37. The rotation angle detecting unit 35 computes a rotation angle θ1 of the input shaft 21 and a rotation angle θ2 of the output shaft 22 on the basis of the electric signals that are respectively generated in the first to fourth output coils 33a to 33d. The process of calculating these two rotation angles θ1, θ2 will be described in detail later. The steering torque detecting unit 36 computes the steering torque τ on the basis of the difference between the two rotation angles θ1, θ2 that are calculated by the rotation angle detecting unit 35, that is, the twist angle of the torsion bar 23. The abnormality determining unit 37 detects whether there is an abnormality in the first to fourth output coils 33a to 33d on the basis of the electric signals that are respectively generated in the first to fourth output coils 33a to 33d. The process of detecting an abnormality in the first to fourth output coils 33a to 33d will also be described in detail later.

<θ1, θ2 Computation Process>

Figure 6:
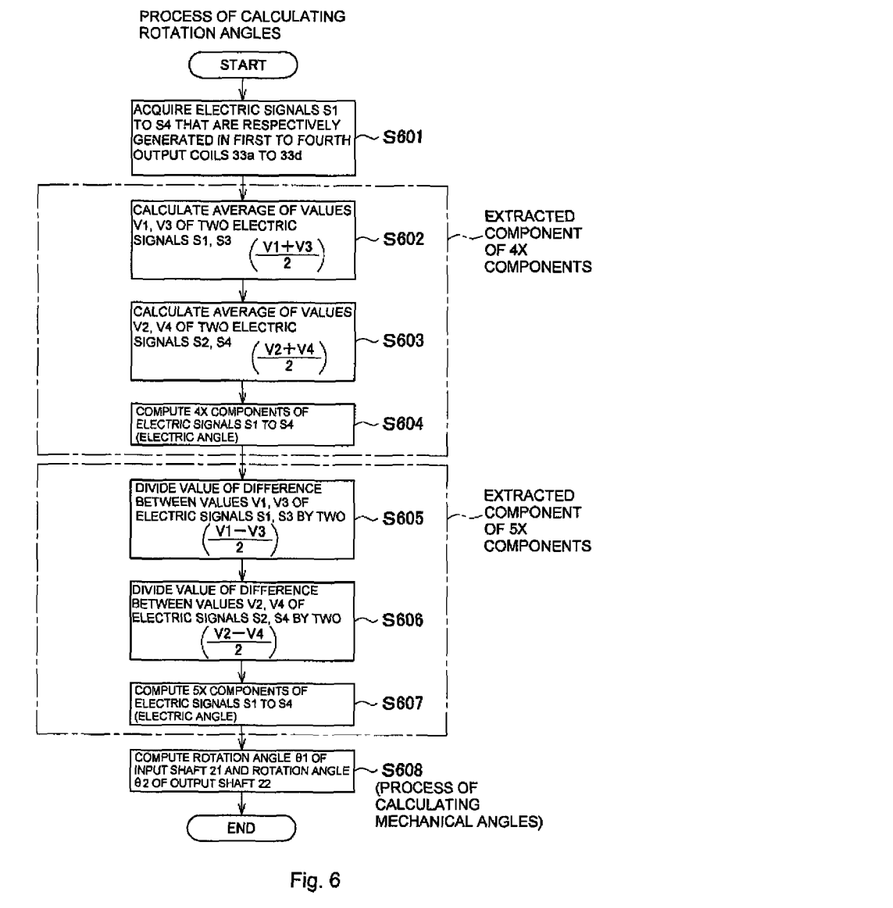
FIG. 6 is a flowchart that shows the procedure of a process of calculating a rotation angle of an input shaft and a rotation angle of an output shaft.

Next, the procedure of the process of detecting the rotation angle of the input shaft 21 and the rotation angle of the output shaft 22 with the use of the torque sensor 7 configured as described above will be described in accordance with the flowchart of FIG. 6. The flowchart is executed at set control intervals on the basis of a control program stored in the CPU 34. The CPU 34 acquires electric signals S1 to S4 that are respectively generated in the first to fourth output coils 33a to 33d (step S601). Values of these electric signals S1 to S4, that is, sampling values V1 to V4, may be respectively expressed by the following mathematical expressions (A) to (D).

$$V1 = \sin(4\theta1) + \sin(5\theta2) \qquad (A)$$

$$\begin{aligned}V2 &= \sin4(\theta1 + 22.5°) + \sin5(\theta2 + 22.5°) \\ &= \sin(4\theta1 + 90°) + \sin(5\theta2 + 112.5°) \\ &= \cos(4\theta1) + \sin(5\theta2 + 112.5°)\end{aligned} \qquad (B)$$

$$\begin{aligned}V3 &= \sin4(\theta1 + 180°) + \sin5(\theta2 + 180°) \\ &= \sin(4\theta1 + 720°) + \sin(5\theta2 + 900°) \\ &= \sin(4\theta1) - \sin(5\theta2)\end{aligned} \qquad (C)$$

$$\begin{aligned}V4 &= \sin(4\theta1 + 202.5°) + \sin5(\theta2 + 202.5°) \\ &= \sin(4\theta1 + 810°) + \sin(5\theta2 + 1012.5°) \\ &= \sin(4\theta1 + 90°) + \sin(5\theta2 + 292.5°) \\ &= \cos(4\theta1) - \sin(5\theta2 + 112.5°)\end{aligned} \qquad (D)$$

where θ1 is the rotation angle (mechanical angle) of the input shaft 21, θ2 is the rotation angle (mechanical angle) of the output shaft 22, 4θ1 is the rotation angle (electric angle) of the input shaft 21, and 5θ2 is the rotation angle (electric angle) of the output shaft 22.

<Process of Extracting 4× Components>

Next, the CPU 34 extracts the 4× components (terms including 4θ1) that are the first signal components from the electric signals that are respectively generated in the first to fourth output coils 33a to 33d as the electric angle of the input shaft 21 having the shaft angle multiplier of the first rotor 31. The CPU 34 initially removes the 5× components (terms including 5θ2) included in the sampling values V1 to V4. That is, the CPU 34 calculates the average of the sampling values V1, V3 of the electric signals S1, S3 that are respectively generated in the first and third output coils 33a, 33c as expressed in the following mathematical expression (E) (step S602).

$$\begin{aligned}(V1 + V3)/2 &= [\{\sin(4\theta1) + \sin(5\theta2)\} + \\ & \quad \{\sin(4\theta1) - \sin(5\theta2)\}]/2 \\ &= \sin(4\theta1)\end{aligned} \qquad (E)$$

In addition, the CPU 34 calculates the average of the sampling values V2, V4 of the electric signals S2 S4 that are respectively generated in the second and fourth output coils 33b, 33d as expressed in the following mathematical expression (F) (step S603).

$$(V2 + V4)/2 = [\{\cos(4\theta1) + \sin(5\theta2 + 112.5°)\} + \\ \{\cos(4\theta1) - \sin(5\theta2 + 112.5°)\}]/2 \\ = \cos(4\theta1) \tag{F}$$

Subsequently, the CPU 34 computes the rotation angle (electric angle) 4θ1 of the input shaft 21 on the basis of the following mathematical expression (G) by using the results computed in step S602 and step S603 (step S604).

$$4\theta1 = \arctan\{\sin(4\theta1)/\cos(4\theta1)\} \\ = \arctan[\{(V1 + V3)/2\}/\{(V2 + V4)/2\}] \tag{G}$$

<Process of Extracting 5× Components>

Next, the CPU 34 extracts the 5× components (terms including 5θ2) that are the second signal components from the electric signals that are respectively generated in the first to fourth output coils 33a to 33d as the electric angle of the output shaft 22 having the shaft angle multiplier of the second rotor 32. The CPU 34 initially removes the 4× components (terms including 4θ1) included in the sampling values V1 to V4. That is, the CPU 34 obtains the difference between the sampling values V1, V3 of the electric signals S1, S3 that are respectively generated in the first and third output coils 33a, 33c and then divides the value of the difference by two as expressed in the following mathematical expression (H) (step S605).

$$(V1 - V3)/2 = [\{\sin(4\theta1) + \sin(5\theta2)\} - \\ \{\sin(4\theta1) - \sin(5\theta2)\}]/2 \\ = \sin(5\theta2) \tag{H}$$

In addition, the CPU 34 obtains the difference between the sampling values V2, V4 of the electric signals S2, S4 that are respectively generated in the second and fourth output coils 33b, 33d and then divides the value of the difference by two as expressed in the following mathematical expression (I) (step S606).

$$(V2 - V4)/2 = [\{\cos(4\theta1) + \sin(5\theta2 + 112.5°)\} - \\ \{\cos(4\theta1) - \sin(5\theta2 + 112.5°)\}]/2 \\ = \sin(5\theta2 + 112.5°) \tag{I}$$

Subsequently, the CPU 34 computes the rotation angle (electric angle) 5θ2 of the output shaft 22 on the basis of the following mathematical expression (J) by using the results computed in step S605 and step S606 (step S607).

$$5\theta2 = \arctan\{\sin(5\theta2)/\cos(5\theta2)\} \tag{J}$$

where cos(5θ2) in the mathematical expression (J) is obtained by modifying the above-described mathematical expression (I) as expressed in the following mathematical expression (K).

$$\sin(5\theta2+112.5°)=\sin(5\theta2)\cos(112.5°)-\cos(5\theta2)\sin(112.5°) \tag{K}$$

On the basis of the mathematical expression (K), cos(5θ2) is expressed by the following mathematical expression (L).

$$\cos(5\theta2)=\{\sin(5\theta2+112.5°)-\sin(5\theta2)\cos(112.5°)\}/\sin(112.5°) \tag{L}$$

<Process of Calculating Mechanical Angle>

Next, the CPU 34 computes the rotation angle θ1 (mechanical angle) of the input shaft 21 and the rotation angle θ2 (mechanical angle) of the output shaft 22 by using the rotation angle 4θ1 (electric angle) of the input shaft 21 and the rotation angle 5θ2 (electric angle) of the output shaft 22 (step S608). Here, each of the electric angles of the input shaft 21 and the output shaft 22 corresponds to a plurality of mechanical angles based on the corresponding shaft angle multiplier. That is, mechanical angles that correspond to the electric angle of which the shaft angle multiplier is 4 are the following four angles. Here, α=4θ1.

$$θ1=(α/4)+0°, (α/4)+90°, (α/4)+180°, (α/4)+270°$$

In addition, mechanical angles that correspond to the electric angle of which the shaft angle multiplier is 5 are the following five angles. Here, β=5θ2

$$θ2=(β/5)+0°, (β/5)+72°, (β/5)+144°, (β/5)+216°, (β/5)+288°$$

The CPU 34 determines the two rotation angles θ1, θ2 by utilizing the fact that the rotation angles θ1, θ2 (mechanical angles) of the input shaft 21 and the output shaft 22 are limited to the range of a maximum allowable twist angle Δθ of the torsion bar 23. That is, the difference (absolute value) between the rotation angles of the input shaft 21 and the output shaft 22 does not exceed the maximum allowable twist angle Δθ. Therefore, it is possible to calculate the rotation angles θ1, θ2 of the input shaft 21 and the output shaft 22 by comparing the difference between the input shaft 21 and the output shaft 22 with the maximum allowable twist angle Δθ of the torsion bar 23. The CPU 34 estimates the rotation angles θ1, θ2 that satisfy the following mathematical expression (M) as the rotation angles θ1, θ2 at each moment.

$$|θ1-θ2|≤Δθ \tag{M}$$

Thus, the process of calculating the rotation angle θ1 of the input shaft 21 and the rotation angle θ2 of the output shaft 22 is completed. The CPU 34 computes the steering torque τ on the basis of the difference between the calculated two rotation angles θ1, θ2.

<Abnormality Determination Process>

Next, the process of determining whether there is an abnormality in the first to fourth output coils 33a to 33d will be described. When there occurs an abnormality in at least one of the first to fourth output coils 33a to 33d, the value (among the sampling values V1 to V4) of the electric signal that is generated in the output coil having an abnormality differs from the value during normal times. Therefore, the rotation angle 4θ1 (electric angle) that is calculated in step S604 and the rotation angle 5θ2 (electric angle) calculated in step S607 in the above-described flowchart of FIG. 6 also differ from the corresponding values during normal times. By utilizing this fact, the CPU 34 (abnormality determining unit 37) detects whether there is an abnormality in the first to fourth output coils 33a to 33d.

That is, the CPU 34 respectively compares sampling values V1c to V4c, which are obtained by substituting the rotation angles 4θ1 (=α), 5θ2 (=β) into the above-described mathematical expressions (A) to (D), with the sampling values V1 to V4 (theoretical values) during normal times. The CPU 34 determines that the first to fourth output coils 33a to 33d are normal when it is determined that the sampling values V1c to V4c coincide with the sampling values V1 to V4, and determines that there is an abnormality when the sampling values V1c to V4c do not coincide with the sampling values V1 to V4. The sampling values V1 to V4 (theoretical values) during normal times are prestored in the CPU 34.

When the CPU 34 determines that there is an abnormality in at least one of the first to fourth output coils 33a to 33d, the CPU 34, for example, stops the process of calculating the rotation angles of the input shaft 21 and the output shaft 22 or the process of calculating the steering torque τ. It is also possible to determine whether there is an abnormality in the first to fourth output coils 33a to 33d by utilizing the fact that $\sin^2 θ + \cos^2 θ = 1$.

Advantageous Effects of Embodiment

Thus, according to the present embodiment, the following advantageous effects are obtained. (1) The stator 30 is arranged in proximity to the outer peripheries of the first and second rotors 31, 32, and the rotation angles θ1, θ2 of the first and second rotors 31, 32, and accordingly, the rotation angles θ1, θ2 of the input shaft 21 and the output shaft 22 are determined, by using in common the electric signals S1 to S4 that are respectively generated in the first to fourth output coils 33a to 33d arranged on the stator 30. Therefore, the size of the body of the torque sensor 7 is reduced by setting the distance between the first and second rotors 31, 32 to a small value.

(2) In addition, in the case where the twist angle of the torsion bar 23 is calculated on the basis of the electric signals that are respectively generated in the first to fourth output coils 33a to 33d, the smaller distance between the first and second rotors 31, 32 is better.

(3) Each of the electric signals, which are respectively generated in the first to fourth output coils 33a to 33d, is obtained by combining the first signal component (4× component) based on a variation of the gap between the stator 30 and the first rotor 31 and the second signal component (5× component) based on a variation of the gap between the stator 30 and the second rotor 32.

According to the present embodiment, the CPU 34 that functions as first extracting means extracts the first signal components from the electric signals of the first to fourth output coils 33a to 33d as the electric angle of the input shaft 21 having the shaft angle multiplier of the first rotor 31. In addition, the CPU 34 that functions as second extracting means extracts the second signal components from the electric signals of the first to fourth output coils 33a to 33d as the electric angle of the output shaft 22 having the shaft angle multiplier of the second rotor 32.

Here, each of the electric angles of the input shaft 21 and the output shaft 22 corresponds to a plurality of mechanical angles based on the corresponding shaft angle multiplier. Thus, the CPU 34 that functions as mechanical angle calculating means determines the rotation angles of the input shaft 21 and the output shaft 22 by utilizing the fact that the rotation angles (mechanical angles) of the input shaft 21 and the output shaft 22 are limited by the maximum allowable twist angle Δθ of the torsion bar 23. That is, the difference (absolute value) between the rotation angles of the input shaft 21 and the output shaft 22 does not exceed the maximum allowable twist angle Δθ. Therefore, by comparing the differences between the multiple rotation angles θ1 corresponding to the electric angle of the input shaft 21 and the multiple rotation angles θ2 corresponding to the electric angle of the output shaft 22, with the maximum allowable twist angle Δθ of the torsion bar 23, it is possible to calculate the rotation angles of the input shaft 21 and the output shaft 22.

(4) With the torque sensor 7 according to the present embodiment, the size of the body is reduced. Therefore, the torque sensor 7 is suitable for the electric power steering system 1 that is required to be reduced in size in terms of, for example, mountability to a vehicle. It is also possible to reduce the size of the body of the electric power steering system 1.

(5) It is possible to detect the rotation angles of the input shaft 21 and the output shaft 22 on the basis of the electric signals that are respectively generated in the first to fourth output coils 33a to 33d. Therefore, in comparison with the case where a magnetic sensor group is individually provided on each of the input shaft 21 and the output shaft 22, it is possible to make the configuration simple. Particularly, it is effective when an abnormality detecting function is provided. For example, taking Patent Document 1 as an example, three magnetic sensors (six in total) need to be provided on each of the first and second shafts. In the present embodiment, it is just required to provide four output coils.

(6) It is possible to determine the rotation angle θ1 of the input shaft 21 as the steering angle θs of the steering wheel 2. The steering angle θs that is calculated by the torque sensor 7 is utilized in various systems, such as a vehicle stability control system. Thus, no dedicated steering angle sensor is required. The high-value-added torque sensor 7, and accordingly, the high-value-added electric power steering system 1, is also obtained.

(7) It is possible to determine a rotation angular velocity ω of the motor 15 on the basis of the rotation angle θ2 of the output shaft 22. It is possible to utilize the rotation angular velocity ω in control over the motor 15. For example, when a brushed motor is used as the motor 15, the ECU 14 is able to accurately acquire the rotation angular velocity ω of the motor 15 through the torque sensor 7, and therefore, it is possible to execute further accurate control over the motor 15.

Other Embodiments

The embodiment may be modified as follows.

In the present embodiment, the torque sensor 7 is applied to a so-called column assist-type electric power steering system. Instead, the torque sensor 7 may be applied to a so-called pinion assist-type or rack assist-type electric power steering system.

In the present embodiment, the ECU 14 calculates a target assist force (accurately, a current command value corresponding to a target assist force) on the basis of the steering torque τ and the vehicle speed V. Instead, the steering angle θs may be added as a parameter for the calculation. It is possible to calculate a target assist force that further reflects a driver's request. The steering angle θs can be calculated on the basis of the rotation angle θ1 of the input shaft 21 as described above.

In the present embodiment, the four output coils 33a to 33d are provided. Instead, five or more output coils may be provided. For example, it is possible to detect the rotation angles of the input shaft 21 and the output shaft 22, and a torque that is applied to the input shaft 21, on the basis of electric signals that are respectively generated in selected four output coils among the five output coils. Even when there is an abnormality in any one of the five output coils, it is possible to calculate the steering torque τ, or the like, by using the remaining four output coils. In addition, in this case, the output coils may be arranged at equal intervals in the rotation direction of the first rotor 31 or second rotor 32. This also applies to the case where six or more output coils are provided.

The shaft angle multiplier of each of the first and second rotors 31, 32 may be changed as needed. However, the respective shaft angle multipliers differ from each other. In the present embodiment, the torque sensor 7 of the electric power steering system 1 is described as an example. However, the torque sensor 7 may be applied to the one other than the electric power steering system.

DESCRIPTION OF REFERENCE NUMERALS

1/ ELECTRIC POWER STEERING SYSTEM
7/ TORQUE SENSOR (TORQUE DETECTING DEVICE)
14/ ECU (ELECTRONIC CONTROL UNIT)
15/ MOTOR
21/ INPUT SHAFT (FIRST SHAFT)
22/ OUTPUT SHAFT (SECOND SHAFT)
23/ TORSION BAR
30/ RESOLVER STATOR
31/ FIRST RESOLVER ROTOR
32/ SECOND RESOLVER ROTOR
33*a* TO 33*d*/ FIRST TO FOURTH OUTPUT COILS
34/ CPU (MICROCOMPUTER)

The invention claimed is:

1. A torque detecting device that detects a torque that acts between first and second shafts respectively coupled to both ends of a torsion bar, comprising:
    a first resolver rotor that is fixed to the first shaft and that has a predetermined shaft angle multiplier;
    a second resolver rotor that is fixed to the second shaft and that has a shaft angle multiplier different from that of the first resolver rotor;
    a resolver stator that is arranged in proximity to outer peripheries of the first and second resolver rotors;
    four output coils that are arranged on the resolver stator and that respectively generate electric signals having different phases on the basis of a variation of a gap between the resolver stator and the first and second resolver rotors due to rotation of the first and second resolver rotors; and
    computing means for calculating a difference between rotation angles of the first and second shafts as a twist angle of the torsion bar on the basis of the electric signals that are respectively generated in the four output coils, and calculating the torque on the basis of the twist angle.

2. The torque detecting device according to claim 1, wherein
    each of the electric signals is obtained by combining a first signal component based on a variation of a gap between the resolver stator and the first resolver rotor with a second signal component based on a variation of a gap between the resolver stator and the second resolver rotor, and
    the computing means includes:
    first extracting means for extracting the first signal components from the electric signals as an electric angle of the first shaft having the shaft angle multiplier of the first resolver rotor;
    second extracting means for extracting the second signal components from the electric signals as an electric angle of the second shaft having the shaft angle multiplier of the second resolver rotor; and
    mechanical angle calculating means for obtaining differences between a plurality of mechanical angles corresponding to the electric angle of the first shaft, which is extracted by the first extracting means, and a plurality of mechanical angles corresponding to the electric angle of the second shaft, which is extracted by the second extracting means, and calculating a mechanical angle of the first shaft and a mechanical angle of the second shaft by comparing these differences with a maximum allowable twist angle of the torsion bar.

3. An electric power steering system comprising the torque detecting device according to claim 2.

4. The electric power steering system according to claim 3, wherein a steering angle of a steering wheel can be determined on the basis of the mechanical angle of the first shaft, which is calculated by the mechanical angle calculating means.

5. An electric power steering system comprising the torque detecting device according to claim 1.

* * * * *